July 25, 1967 J. R. FEATHERSTON 3,333,205

TIMING SIGNAL GENERATOR WITH FREQUENCY KEYED TO INPUT

Filed Oct. 2, 1964

INVENTOR
JOHN R. FEATHERSTON

By *Arthur Decker*
ATTORNEY

United States Patent Office 3,333,205

Patented July 25, 1967

3,333,205

TIMING SIGNAL GENERATOR WITH FREQUENCY KEYED TO INPUT

John R. Featherston, Tucson, Ariz., assignor to International Business Machines Corporation, Armonk, N.Y., a corporation of New York Filed Oct. 2, 1964, Ser. No. 401,195
14 Claims. (Cl. 328—63)

ABSTRACT OF THE DISCLOSURE

A generator of square waves suitable for clocking digital data in which pulses corresponding to the data transitions are formed by an amplifier-inverter, differentiators, clippers and an OR gate, sharpened by a one-shot, and compared in AND gates with the output of a square-wave generator and its complement set to the nominal pulse repetition rate of the data. A capacitor, charged according to the integrated AND gate outputs, is connected in the generator feedback circuit to thereby modify its pulse rate output.

Figures 1, 2:
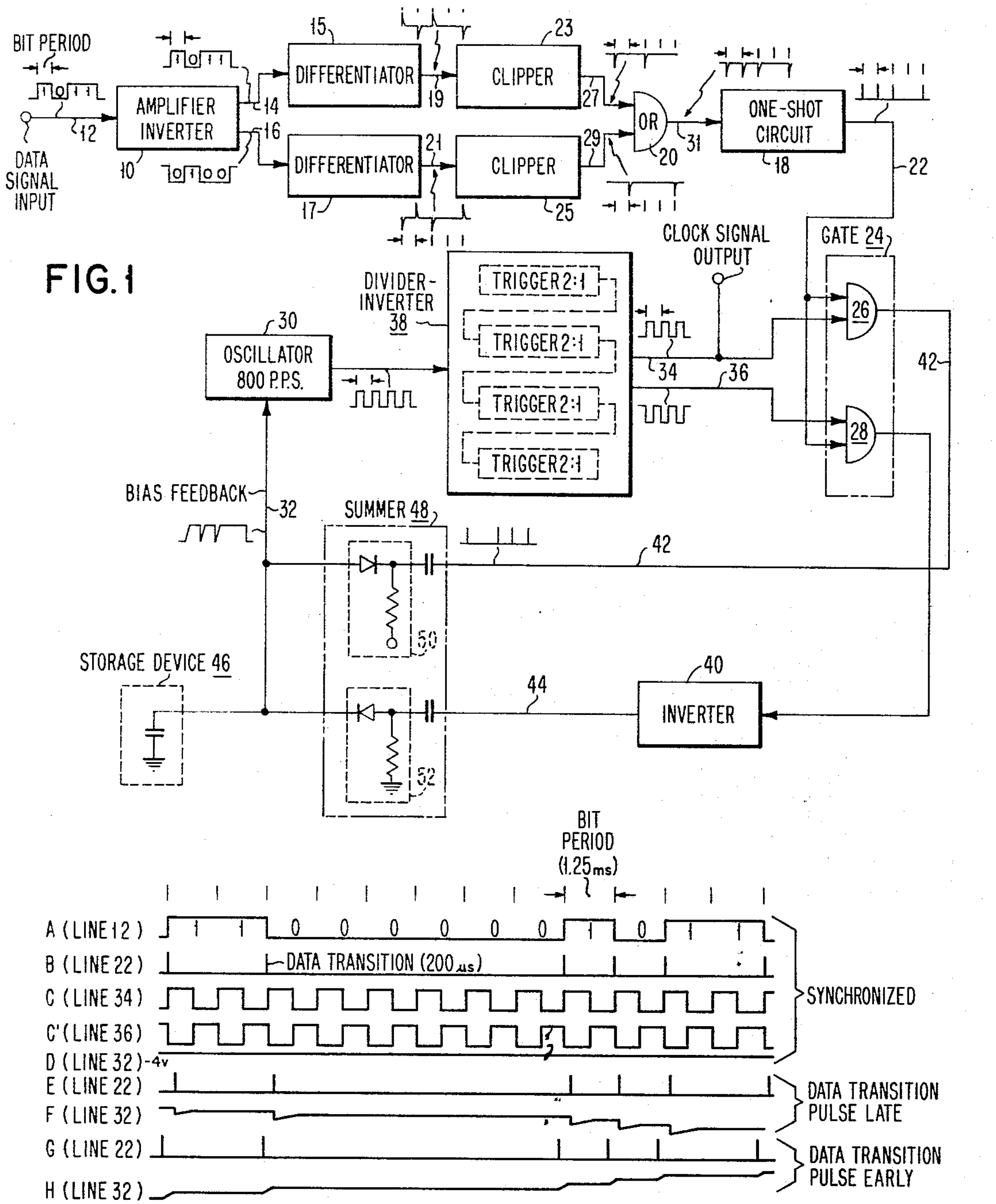

This invention relates to receivers for digital signal transmission systems and, more particular, to the "clocking" means incorporated in the receiver for generating a timing signal by which may be defined binary digit (i.e., "bit") periods designating the binary significance of the received signal.

This application is a continuation-in-part of the application, "Timing Signal Generator," of Featherston, Ser. No. 184,155, filed Apr. 2, 1962, now abandoned.

As is known, in order to avoid confusion of binary values characterizing the signal developed in the receiver of a digital transmission system, some means are required to generate at the receiver a clock signal having a repetitive wave shape synchronized in frequency with the rate at which the binary signal may be emitted by the transmitter. A clock signal may have a rectangular wave shape; the pulse repetition rate of the signal is established by the design of the generator and synchronized with binary transitions in the received signal. Furthermore, if it is of square wave shape, inherent provision for mid-bit period sampling pulses is obtained. Such a clock signal may readily be provided by synchronized square wave generators having a feedback connection to furnish reasonable freedom from frequency drift.

Where, over an extensive period of time, there are no transitions in the received signal, i.e., where a continuous series of "one" bits or of "zero" bits are transmitted, there is no synchronization of the generator and, consequently, the frequency of its output may change slightly; the resulting bit periods defined by the clock signal, when keyed to the received signal, may provide erroneous bit information. Additionally, spurious interferences may affect the transmission and cause deviations of the appearance of bits in the received signal from their counterparts in the transmitted signal, and a consequent loss of synchronization. These characteristics manifest as a timewise discrepancy betwen the received signal and the clock signal and have been designated as a form of "jitter."

In the past, many techniques have been devised to minimize this type of jitter and the effects thereof. One such system utilizes a separately transmitted clock wave which is received, detected and squared to form the clock signal. Synchronization between the binary signal and the clock wave at the transmitter is essential in this system, and equipment must be provided for this purpose; furthermore, a separate channel for clock signal transmission is required and, where plural channels are used, random discrepancy in phase is common. In other systems, where no special clock wave is transmitted, a phase comparison is made between the output of the receiver generator and a frequency reference, such as a tuned fork or a stable tuned amplifier, and an error signal is developed which is fed back to synchronize the generator. This system is capable of producing a clock signal with precision of 0.1% but is not particularly simple to implement and accuracy with regard to the received transmission is not assured.

It is therefore an object of this invention to provide, in the receiver of a digital transmission system, a circuit for generating a clock signal characterized by excellent accuracy of synchronization over extended periods of time when referenced to the bit period, even where there are no data transitions, with the rate at which binary signals may be received, by independence from the effects of jitter, by non-distortion of rectangular waveform, by nonsensitivity to spurious interferences such as caused by lightening or similar atmospheric disturbances, and by reliable operation despite oscillator drift in either transmitter or receiver or Doppler shift in the transmission medium.

It is a further object of this invention to accomplish the above with a simple and stable circuit adaptable to considerable variations in bit rate of the recieved signal.

A feature of the invention is adaptability to data transmission systems of various bit rates.

Briefly, the arrangement of the present invention includes a trigger circuit, a gate, a summer, and an energy storage device coupled to the clock generator output terminals, one of which terminals provides the clock signal. In the preferred embodiment, the gate comprises a pair of "AND" circuits, one input to each being an output from the clock generator and the other input to both being the output of the trigger circuit, which pulses in response to each data transition in the received signal. The gate outputs are fed to the summer, the output of which represents the number of data transition pulses occurring early or late of transition of the clock signal. The energy storage device is timed by the summer output to accumulate charge, which, as a voltage, is fed back as bias to control the clock generator pulse repetition rate. Effectively, then, the present circuit is a servo system which measures the jitter at the time of each transition of the received signal and adjusts the pulse repetition rate of the clock generator such that the jitter is minimized.

Other features and advantages of the invention, as well as objects thereof, will become apparent with reference to the following description of the drawings. It is expressly to be understood, however, that the description and figures are for the sole purpose of illustrating a preferred form of the invention and are not intended as a definition of its limits.

FIGURE 1 is a block diagram of part of the receiver of a binary data transmission system in which the invention is shown in schematic form; and FIGURE 2 is a set of wave shape diagrams depicting the operation of the receiver of FIGURE 1.

Referring now to FIGURE 1, here is shown part of the receiver of a binary data transmission system in which the invention is incorporated to provide a precision clock signal output utilizing, as input, a square wave oscillator, and, for synchronization, a one-shot circuit having an output for every transistion in the incoming data signal.

The data signal input, on line 12, is to amplifier-inverter 10 and may be of the non-return-to-zero form as shown by the Example 1011, requiring four serial bit periods. Amplifier-inverter 10 emits a pair of complementary signals of the same form as the data signal on lines 14 and 16. The signals on lines 14 and 16 are peaked by differentiators 15 and 17 to give a series of bipolar pulses on lines 19 and 21, respectively, one corresponding to each data transition. Clippers 23 and 25 remove the positive pulses from their respective signals and the resulting negative pulse trains, on lines 27 and 29, are summed by OR gate 20 to yield the signal shown on line 31. This signal is further shaped by triggering one-shot circuit 18, which emits a pulse of short duration corresponding to each transition in the data signal from a one bit representation to a zero bit representation or vice versa. The output signal from one-shot circuit 18, on line 22 as shown, provides one input to each of AND circuits 26 and 28 of gate 24.

The present clock generator includes square-wave oscillator 30, the pulse repetition rate of which may be adjusted by varying its bias on line 32. The output signal from oscillator 30 is divided and inverted by divider-inverter 38 to emit a pair of complementary signals, shown on lines 34 and 36, which may be at the pulse repetition rate of the output signal of oscillator 30 or divided down to ½, ¼, ⅛ or 1/16 of this pulse repetition rate. Such provision is desirable in the receiver of a data transmission system to provide for the various system data transmission rates commonly found. The signal on line 34 comprises the clock signal output of the present system as is so designated in the drawing, and also comprises the second input to AND circuit 26 of gate 24; its complement on line 36 comprises the second input to AND circuit 28, the output of which is inverted by inverter 40. It may be noted that AND circuit 26 passes data transition pulses which occur during times when the positive half-cycle of the square-wave signal on line 34 is present whereas AND circuit 28 passes data transition pulses which occur during times when the negative half-cycle of the square-wave signal on line 34 is present, since, at the latter time the positive half-cycle of the square-wave signal on line 36 is present. In effect then, if a data transition pulse occurs "late" of the rising edge of the square-wave signal, AND circuit 26 passes it, but if the data transition pulse occurs "early" of the rising edge of the square-wave signal AND circuit 28 passes it; if the data transition pulse occurs at the rising edge of the square-wave signal, each AND circuit passes half of it. As shown by the wave shape associated with line 32, the signals on lines 42 and 44 are effective to modify the charge of storage device 46 through summer 48; charging circuits 50 and 52 for storage device 46 are also provided by summer 48. The integral of the charge on storage device 46 is fed back as vias to oscillator 30 on line 32 and has such polarity as to vary the pulse repetition rate of oscillator 30 to correspond to that of the data transition pulses.

FIGURE 2 comprises a set of wave shape diagrams depicting the activity of the circuit of FIGURE 1 for the data signal input (line 12), occurring in bit periods of 1.25 milliseconds, and represented as 110000001011 in wave shape A. Wave shape B shows the data transition pulses (line 22), each 200 microseconds in duration, that are emitted by one-shot circuit 18. Divider-inverter 38 is set for an 800 pulse per second rate output of the clock signal output (wave shape C, line 34). Presuming no disparity in frequency between the data signal input and the clock signal output, AND circuit 26 of gate 24 will pass pulses equal in duration to half that of the data transition pulses to circuits 50 and 52 of summer 48. Charging circuits 50 and 52 maintain wave shape D (line 32) at a constant potential, here shown as −4 volts, corresponding to the average data rate expected to be received. This bias provides a constant median pulse repetition rate in oscillator 30.

It has been pointed out that the present invention operates as a servo system in providing a clock signal output synchronized with the data signal input bit period rate. Since a servo system may be regarded as being capable of eliminating misoperation as it arises, it will be advantageous, in discussing how the invention corrects for loss of synchronization, to consider the feedback connection (line 32) open at the input to oscillator 30.

Wave shape E shows data transition pulses occurring late of the leading edges of clock signal output wave shape C. It is seen from wave shape F that the charge time for storage device 46 (restricted to the positive half-cycles of the clock signal) is reduced, resulting in a lowering of the average potential level of line 32.

Wave shape G shows data transition pulses occurring early of the leading edges of the clock signal output wave shape C, i.e., of the trailing edges of its complement wave shape C′ (line 36). It is seen from wave shape H that the data transition pulses provide an increment to the charge of storage device 46, which effectuates a gradual raising of the average potential level of line 32.

Those skilled in the art will now appreciate that the system of the invention is reliable despite spurious interferences with the transmission; such transients, although operated upon just as though they comprise data transitions, are as likely to occur early of the leading edges of the clock signal wave shape as late thereof, and, consequently, are statistically ineffective.

It is to be understood that the embodiment of the invention shown and described is to be considered as preferred; the various modifications that may be resorted to by those skilled in the art will depart from neither the spirit of the invention nor the scope of the appended claims. With regard to the circuit of FIGURE 1, for instance, it should be apparent that summer 48, storage device 46, etc. and other components may take forms different from those shown and still perform functionally within the constraints imposed by the example of FIGURE 2. Additionally, it is not intended that the invention be limited to the specific arrangement of components chosen as preferred since other connections are contemplated; for instance, bias feedback line 32 may connect to divider-inverter 38 as well as to oscillator 30, and thereby control the selected trigger.

What is claimed is:

1. In a receiving system for electrical signals, means for providing a clock signal synchronized with the received data signal, comprising:
  - circuit means responsive to the data signal to emit a data transition pulse;
  - an oscillator having a control input;
  - a gate responsive to the transition pulse from said circuit means and the output signal from said oscillator to emit a first signal when a transition pulse occurs subsequent to a transition of the output signal from said oscillator and a second signal when a transition pulse occurs prior to a transition of the output signal from said oscillator;
  - a storage device;
  - a summer connected to said storage device and responsive to the first signal from said gate to alter the charge in said storage device in a first direction and responsive to the second signal from said gate to alter the charge in said storage device in a second direction; and
  - means to connect said storage device to the control input of said oscillator.

2. The system of claim 1 wherein said circuit means comprises:
  - an inverter having an output signal representing the complement of the data signal;
  - circuits responsive to the data signal and the output signal of said inverter to generate a pulse corresponding to each transition of the data signal inverter; and means to further shape the pulses generated by said circuits.

3. The system of claim 1 wherein said gate comprises:
  - a pair of AND circuits both responsive to the transition pulse from said circuit means and each responsive to the output signal from said oscillator during alternate half sycles.

4. The system of claim 1 wherein said oscillator generates a pair of complementary output signals; and said gate comprises a pair of AND circuits both responsive to the transition pulse from said circuit means and each responsive to one of the output signals from said oscillator.

5. The system of claim 1, and a frequency divider capable of being set to one of a plurality of dffierent rates of data signal transition and responsive to the output of said oscillator;

and wherein said gate is responsive to the transition pulse from said circuit means and the output of said frequency divider.

6. The system of claim 1, and an inverter responsive to one of the signals from said gate;

and wherein said summer is responsive to one of the signals from said gate and the signal from said inverter.

7. The system of claim 1 wherein the time constant of said storage device is long as compared to the period of said oscillator.

8. The system of claim 1 wherein the duration of the transition pulse emitted by said circuit means is short as compared to the period of said oscillator.

9. In a receiving system for electrical data signals a circuit for providing a clock signal synchronized with the received data signal, comprising:

a one-shot circuit responsive to each data signal transition to emit a transition pulse;

an oscillator nominally set at the rate of data signal transitions and having a control output;

a gate responsive to the transition pulse from said one-shot circuit and the output signal from said oscillator to emit a first signal when a transition pulse occurs during a half-cycle of the signal from said oscillator and a second signal when a transition pulse occurs during the other half-cycle of the signal from said oscillator;

a storage device;

a summer connected to said storage device and responsive to the first signal from said gate to alter the charge in said storage device in a first direction and responsive to the second signal from said gate to alter the charge in said storage device in a second direction; and means to connect said storage device to the control input of said oscillator.

10. The system of claim 9, and inverter means to generate a signal complementary to the data signal;

a pair of differentiators, one responsive to the data signal and the other responsive to the complementary signal to generate a pair of signal pulse trains;

a pair of clippers one responsive to each pulse train output of said differentiators to generate a pair of signal trains having the same polarity of their pulses;

an OR gate responsive to the outputs of said clippers to generate a composite unipolar pulse trains; and means to connect the output of said OR gate to the input of said one-shot circuit.

11. In a receiver for a binary signal wherein the changes in value of the received signal are represented by pulses in a signal train, means for providing a clock signal synchronized with the bit periods characterizing the received signal, comprising:

a variable frequency oscillator;

a coincidence circuit responsive to both the transition pulse signal and the output signal from said oscillator to emit a pair of signals each indicating a predetermined phase relationship between the transition signal and the oscillator signal;

a storage device;

a summer connected to said storage device and responsive to one signal from said coincidence circuit to alter the charge in said storage device in a first direction and responsive to the other signal from said coincidence circuit to alter the charge in said storage device in a second direction; and means to vary the frequency of said oscillator in response to the charge in said storage device.

12. In a receiver for a binary signal wherein the changes in value of the recived signal are represented by pulses in a signal train, means for providing a clock signal synchronized with the bit periods characterizing the received signal, comprising:

a variable frequency oscillator;

complementing means connected to said oscillator;

a coincidence circuit including a pair of gates, one responsive to the transition pulse signal and the output signal from said oscillator and the other responsive to the transition pulse signal and the output signal from said complementing means;

a storage device;

a summer connected to said storage device and connected to one gate of said coincidence circuit to generate a signal for altering the charge in said storage device in a first direction and connected to the other gate of said coincidence circuit to generate a signal for altering the charge in said storage device in a second direction; and means to vary the frequency of said oscillator in response to the charge in said storage device.

13. The combination of claim 12, and a frequency divider connected between said oscillator and said inverter.

14. The combination of claim 13, and an inverter connected between a gate of said coincidence circuit and said summer.

References Cited

UNITED STATES PATENTS 3,249,886 5/1966 Anderson et al. ______ 331—11
3,286,085 11/1966 Rado ______________ 328—72 X ARTHUR GAUSS, *Primary Examiner.*

D. D. FORRER, *Assistant Examiner.*